United States Patent
Chen et al.

(10) Patent No.: US 6,287,203 B1
(45) Date of Patent: Sep. 11, 2001

(54) METHOD AND STRUCTURE FOR COUPLING A STEP MOTOR SHAFT

(75) Inventors: Bill Chen, Hsinchu; Emmet Chen, Taichung Hsien; Te-Chih Chang, Hsinchu, all of (TW)

(73) Assignee: Mustek Systems Inc., Hsinchu (TW)

( * ) Notice: Subject to any disclaimer, the term of this patent is extended or adjusted under 35 U.S.C. 154(b) by 0 days.

(21) Appl. No.: 09/429,320

(22) Filed: Oct. 26, 1999

(51) Int. Cl.$^7$ ........................................ F16D 3/10
(52) U.S. Cl. ........................ 464/1; 464/160; 464/87
(58) Field of Search ........................ 464/1, 160, 87, 464/89; 403/358, 357, 356, 355

(56) References Cited

U.S. PATENT DOCUMENTS

| | | | |
|---|---|---|---|
| 5,127,316 | * | 7/1992 | Ishiwata .................................. 464/89 |
| 5,226,853 | * | 7/1993 | Courgeon ............................. 464/160 |
| 5,836,821 | * | 11/1998 | Yamada et al. ........................ 464/89 |
| 6,106,187 | * | 8/2000 | Mina ..................................... 403/356 |

* cited by examiner

Primary Examiner—Lynne H. Browne
Assistant Examiner—Aaron Dunwoody

(57) ABSTRACT

A method and structure for coupling to a step motor shaft is characterized by providing a predetermined back-lash distance defined between the step motor shaft and a key, thereby to instantly reach the desired speed for driving a load. Accordingly, a shaft coupling device is provided to connect to a rotatable load. The shaft coupling device has a key which maintains a back-lash distance defined between a step motor shaft and the key. Eventually, when the step motor shaft is not driving the load, they are separated. When the step motor shaft is driven by the step motor, it self-spins in a first direction and travels through a distance so as to form a predetermined back-lash distance between the key. As soon as the back-lash distance is formed, the step motor shaft reverses its rotation direction and then starts to travel through the predetermined back-lash distance to drive the load. The speed of the step motor shaft soon increases as it rotates in a second direction and approaches the load. At that moment, the speed of the step motor has already been accelerated. Consequently, the desired speed of the step motor for driving the load will be instantly reached.

9 Claims, 5 Drawing Sheets

METHOD AND STRUCTURE FOR COUPLING A STEP MOTOR SHAFT

BACKGROUND OF THE INVENTION

A. Field of the Invention

The present invention relates to a method and structure for coupling a step motor shaft, especially to a method and structure which can instantly increase the initial speed of the step motor for driving the load by traveling through a predetermined back-lash distance defined between the key of the shaft coupling device and the step motor shaft.

B. Description of the Prior Art

According to conventional technology, the structure of a step motor for driving a load via a shaft coupling device is illustrated in FIG. 1. The shaft coupling device 11 is connected to a load (not shown) and mounted with a key 12 for connecting to the step motor shaft 13. Since the step motor shaft 13 is secured to the shaft coupling device 11, so the load will be driven by the step motor shaft 13 when the step motor shaft 13 rotates. Due to the resistance of the load, the initial speed for driving the load will be slow down and cannot instantly drive the load at a desired speed.

To increase the initial speed for driving the load, a conventional approach applies a clutch for progressively increasing the resistance of the load put onto the step motor. Another conventional approach uses an electronic speed controller for controlling the initial speed for driving the load in response to the moment of torsion. When the speed of the step motor is low, its moment of torsion is increased. In contrast, when the speed of the step motor is high, its moment of torsion is decreased. Accordingly, the initial speed for driving the load can be controlled by an electronic speed controller to be progressively increased. Eventually, the step motor can drive the load at a desired speed.

However, the mechanism for controlling the step motor by a clutch is complicated, which will inevitably increase the manufacturing cost. On the other hand, if the initial speed for driving the load is controlled by an electronic speed controller, the time and distance required for acceleration will be too long. Thus, for a step motor of low power, it would be desirable to improve its initial speed for driving a load using a simple mechanism.

SUMMARY OF THE INVENTION

Accordingly, it is an object of the present invention to provide a method and structure for coupling a step motor shaft which can instantly reach the desired speed when driving the load by providing a constant back-lash distance defined between the key of the shaft coupling device and the step motor shaft.

It is another object of the present invention to provide a simple method and structure for coupling a step motor shaft which is adaptable for a low-power step motor to reach the desired speed when driving the load.

In accordance with the present invention, a method and structure for coupling a step motor shaft is provided by forming a predetermined back-lash distance defined between the key of the shaft coupling device and the step motor shaft, thereby to instantly reach the desired speed when driving a load. According to a preferred embodiment of the present invention, the shaft coupling device is connected to a rotatable load. The shaft coupling device has a key which maintains a back-lash distance with a step motor shaft. Eventually, when the step motor shaft is not driving the load, they are not connected together. When the step motor shaft is driven by the step motor, it spins in a first direction and travels through a distance so as to leave a predetermined back-lash distance with the key. As soon as the back-lash distance is formed, the step motor shaft reverses its rotation direction and then starts to travel through the predetermined back-lash distance. The initial speed for driving the load soon increases as the shaft rotates in a second direction and its key approaches to the load to drive the load. At that moment, the desired speed for driving the load has already been reached. Consequently, the desired speed for driving the load will soon be reached.

BRIEF DESCRIPTION OF THE DRAWINGS

These and other objects and advantages of the present invention will become apparent by reference to the following description and accompanying drawings wherein.

DETAILED DESCRIPTION OF THE PREFERRED EMBODIMENTS

A preferred embodiment of the invention is described below. This embodiment is merely exemplary. Those skilled in the art will appreciate that changes can be made to the disclosed embodiment without departing from the spirit and scope of the invention.

Since the initial speed of a self-spinning step motor shaft is faster than that of a loaded step motor, so allowing the step motor shaft to self-spin while traveling through a back-lash distance before actually driving the load can instantly reach the desired speed for driving the load.

Figure 1:
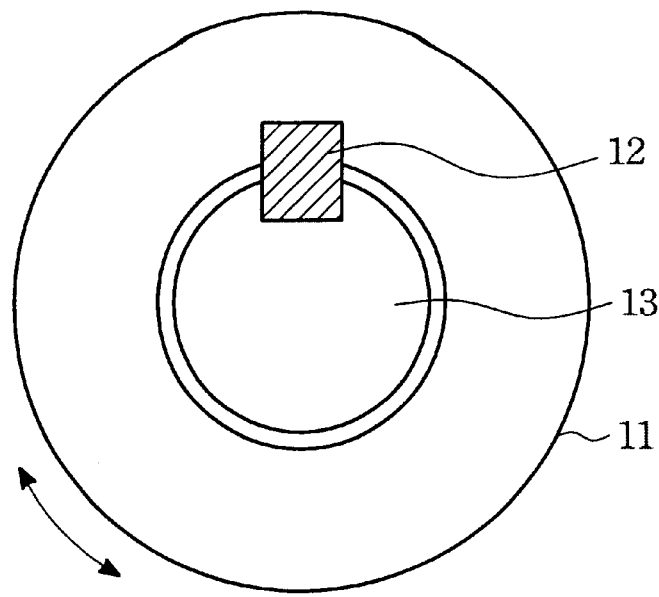
FIG. 1 is a cross-sectional view showing the structure of a conventional shaft coupling device.
Figure 2A:
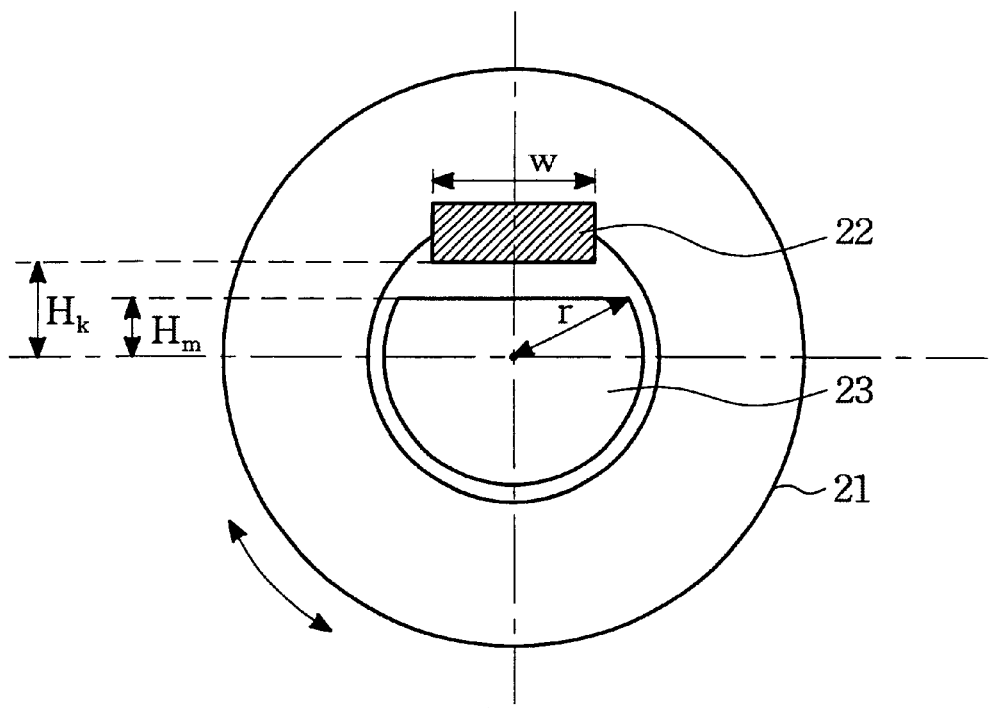
FIG. 2A is a cross-sectional view showing the structure of a shaft coupling device according to a preferred embodiment of the present invention.

Accordingly, a preferred embodiment of the present invention is illustrated in FIG. 2A. As illustrated in FIG. 2A, the shaft coupling device 21 is ring-shaped and has a key 22 mounted on the inter-rim thereof. The shaft coupling device 21 is directly coupled to the load (not shown). The center of the shaft coupling device 21 has enough room for adapting to the step motor shaft 23. The load can be driven by the step motor shaft 23 when the step motor shaft 23 touches the key 22. The step motor shaft 23 and key 22 maintains a predetermined back-lash distance before the step motor shaft 23 actually drives the load. So, when the step motor shaft 23 and the load are still, the step motor shaft 23 and the shaft coupling device 21 are separated with a distance as illustrated in FIG. 2A.

Figure 2B:
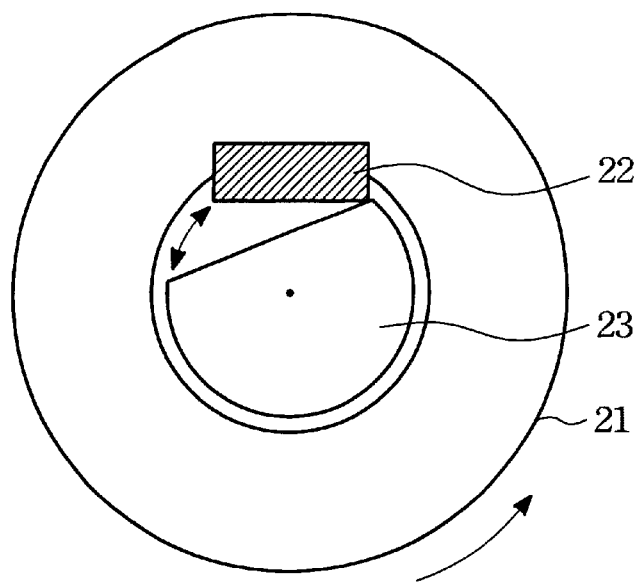
FIG. 2B is a cross-sectional view showing the situation when the shaft coupling device is rotating in a first direction.
Figure 2C:
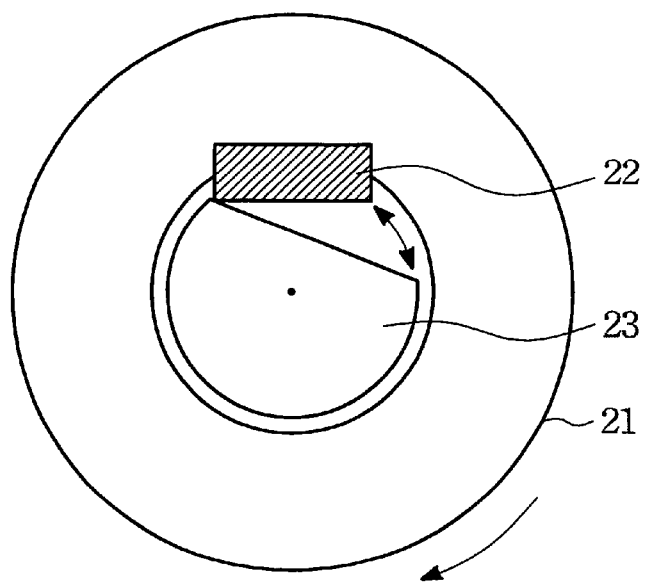
FIG. 2C is a cross-sectional view showing the situation when the shaft coupling device is rotating in a second direction.

The purpose for maintaining a back-lash distance is to allow the step motor shaft 23 to self-spin for a period of time while travelling through the back-lash distance, thereby to increase its initial speed for driving the load. When the step motor is activated, the step motor shaft 23 rotates in a first direction as illustrated in FIG. 2B. When the step motor shaft 23 rotates in the first direction, the step motor is still at a state of self-spinning. As soon as the back-lash distance defined between the key 22 and the step motor shaft 23 has been formed, the step motor shaft 23 reverses its rotation direction and then starts to travel through the predetermined back-lash distance. Eventually, it will allow the key 22 to connect to the load, thereby to driving the load with an improved initial speed as illustrated in FIG. 2C.

The back-lash distance defined between the step motor shaft 23 and the key 22 can be computed using a technology known to the artisans. For instance, the back-lash distance defined for the structure as illustrated in FIG. 2A can be computed by means of:

Back-lash distance/2=

$$\arccos\left(\frac{Hm}{\sqrt{(W/2)^2 + Hk^2}}\right) - \arccos\left(\frac{Hk}{\sqrt{(W/2)^2 + Hk^2}}\right)(\text{rad}) =$$

$$\arccos\left(\frac{2Hm}{\sqrt{W^2 + 4Hk^2}}\right) - \arccos\left(\frac{2Hk}{\sqrt{W^2 + 4Hk^2}}\right)(\text{rad})$$

According to this formula, the advantages of the present invention can be illustrated more clearly from the following example. If the constant back-lash distance is set as 0 rad, and the moment of inertia for the load as 0.5 kg-mm, then the highest speed for a step motor will be 1300 pps. In contrast, if the back-lash distance is set as 0.18 rad, and the moment of inertia for the load also set as 0.5 kg-mm, then the highest speed for the step motor to drive the load will be increased to 2000 pps.

Figure 3A:
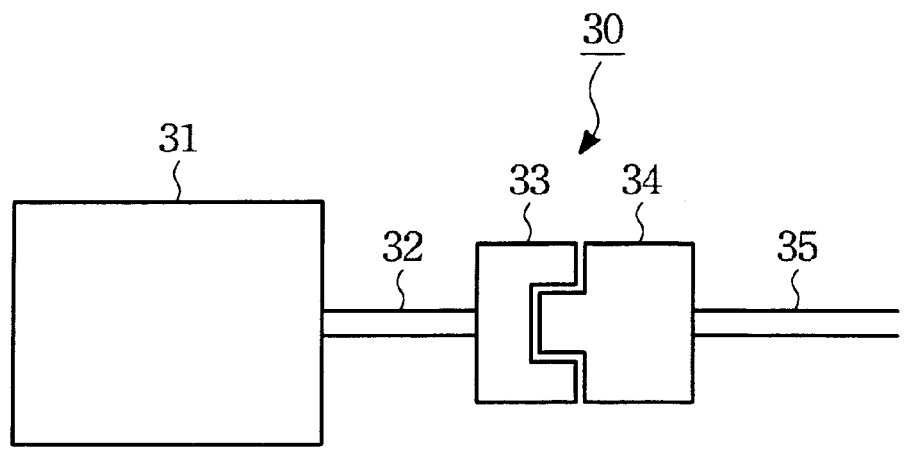
FIG. 3A is a side view showing the structure of a shaft coupling device according to another preferred embodiment of the present invention.
Figure 3B:
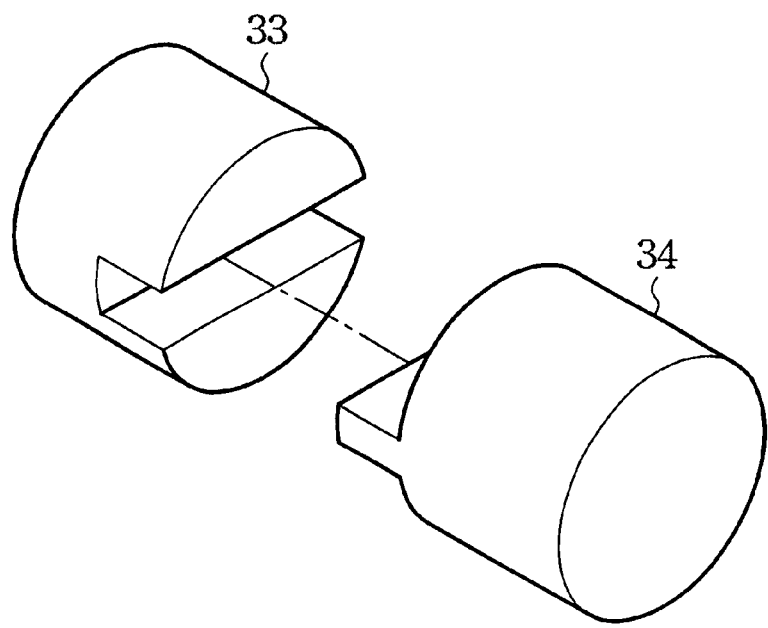
FIG. 3B is an enlarged view showing the structure of the shaft coupling device according to the preferred embodiment of the present invention as illustrated in FIG. 3A.

It is known to those skilled artisans that there may be various modifications based on the preferred embodiment as illustrated in FIG. 2A to increase the initial speed of the step motor for driving a load. For instance, FIG. 3A illustrates another preferred embodiment of the present invention. The shaft coupling device 30 includes a male coupling device 34 and a corresponding female coupling device 33. The structure of the shaft coupling device 30 can be illustrated more clearly from the enlarged view as illustrated in FIG. 3B. The male coupling device 34 is mounted on the load 35 while the female coupling device 33 is mounted to the step motor shaft 32. The step motor shaft 32 can drive the load 35 when the male coupling device 34 and the female coupling device 33 are connected together after travelling through a back-lash distance.

As illustrated in FIG. 3A, the male coupling device 34 and the corresponding female coupling device 33 are separated when they are at still. So, when the step motor shaft 32 rotates in a first direction and forms a predetermined back-lash distance between the male coupling device 34 and the female coupling device 33, the step motor shaft 32 reverses its rotation direction into a second direction and travels through the predetermined back-lash distance so as to drive the load 35. At that moment, the step motor 31 has already been accelerated. So, the initial speed of the step motor 31 for driving the load can be increased instantly.

Figure 4:
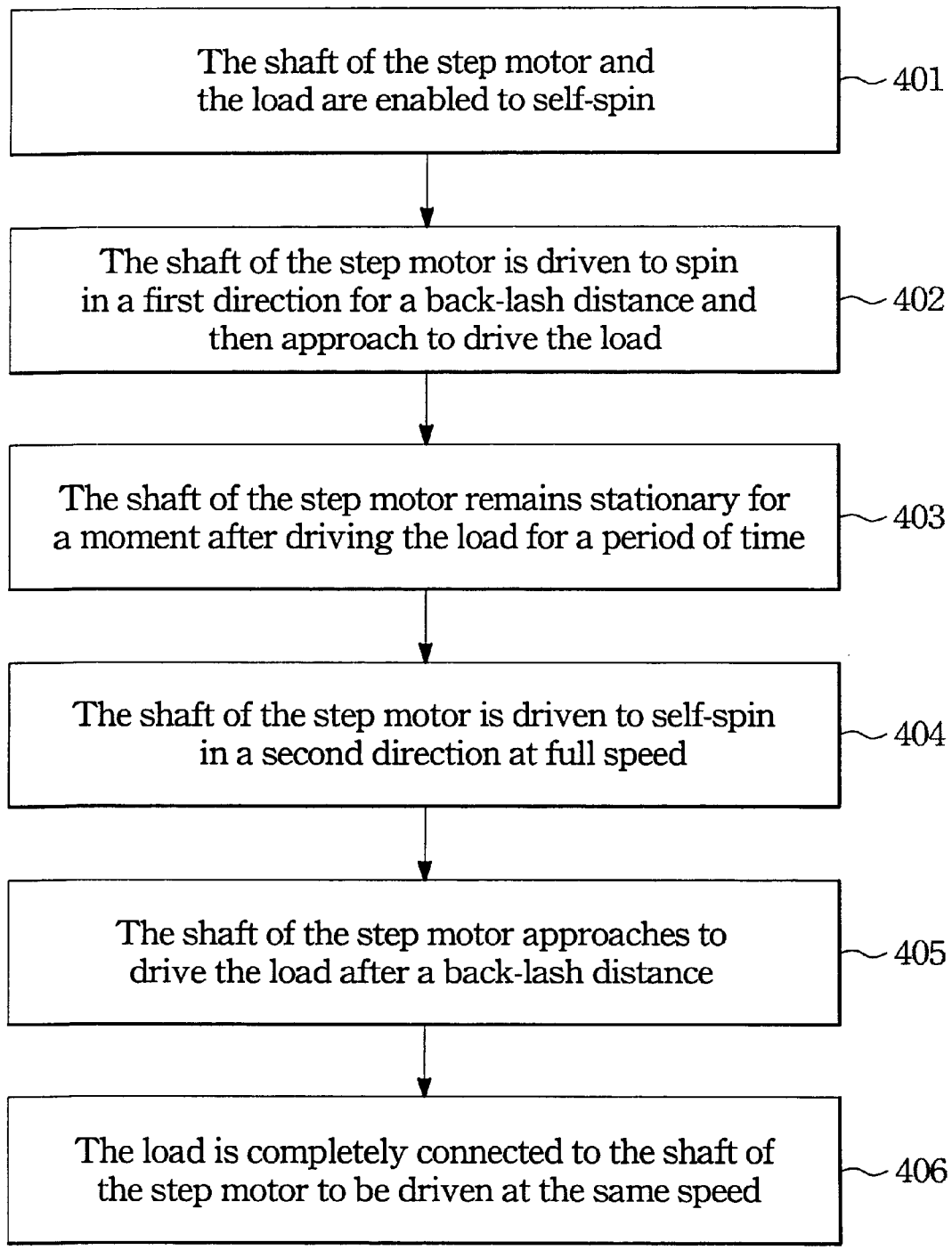
FIG. 4 is a flowchart showing the operation steps of the shaft coupling device according to the preferred embodiment of the present invention.

Accordingly, the method for coupling a step motor shaft according to the present invention can be illustrated in FIG. 4 as follows:

401: The step motor shaft is enabled to self-spin.

402: The step motor shaft is driven to spin in a first direction for a distance, which is longer than the predetermined back-lash distance, and then approaches to touch the load.

403: The step motor shaft and the load remains stationary for a moment after the predetermined back-lash distance is formed between the key of the shaft coupling device and the step motor shaft.

404: The step motor shaft is driven to reverse its rotation direction and starts to travel through the predetermined back-lash distance just formed.

405: The step motor shaft touches the load after traveling through the predetermined back-lash distance.

406: Since the load has a resistance, the step motor shaft will be completely connected to the key of the shaft coupling device after traveling through the back-lash distance. Eventually, the load will be driven at a desired speed instantly.

Figure 5:
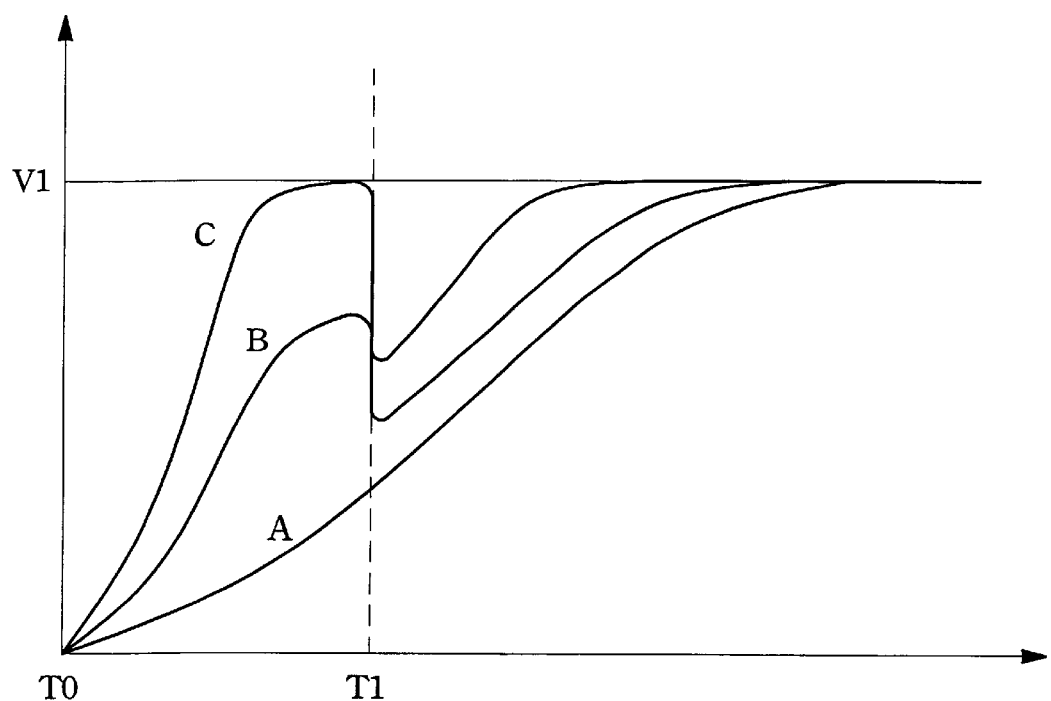
FIG. 5 is a diagram showing the relationship of velocity and time according to different shaft coupling devices.

The advantage of the present invention can be illustrated more clearly with reference to FIG. 5. Referring to FIG. 5, the horizontal axis refers to time while the vertical axis refers to the speed. The curves A, B, and C represent the relationships between time and velocity for different shaft coupling devices A, B, and C respectively. The curve A represents the time and velocity relationship for a conventional shaft coupling device A. The curves B and C represent the time and velocity relationships for shaft coupling devices B and C which have back-lash distances according to the present invention. T0 represents the time when the step motor shaft is enabled. T1 represents the time when the step motor shaft starts to drive the load. V1 represents the desired speed for driving the load.

Since the step motor shafts can accelerate more quickly without the load, so the speeds of curve B and C during the time period from T0 to T1 are both faster than curve A. At time T1, the curve B and C have already reached a high speed at that moment. However, the speeds of curves B and C drop quickly right after driving the load at T1. Before long, the speeds of curves B and C soon reach the desired speed V1 for driving the load. From FIG. 5, we can see that the time required for curves B and C to reach a desired speed V1 is shorter than curve A. It shows that the step motor shaft with a back-lash distance can reach the desired speed for driving the load instantly.

The present invention can be widely applicable to low-power step motors used mainly in office electronic products, such as printers, optical scanners, digital cameras, etc. It is to be understood that the scope of the invention also comprehends embodiments different from the one described, yet within the scope of the claims. For example, the outlook of the shaft coupling device could have various modifications, so long as the junction between the step motor shaft and the key forms a back-lash distance.

While this invention has been described with reference to an illustrative embodiment, this description is not intended to be construed in a limiting sense. Various modifications and combinations of the illustrative embodiment, as well as other embodiments of the invention, will be apparent to persons skilled in the art upon reference to the description.

What is claimed is:

1. A structure for coupling a step motor shaft, comprising:
   a ring-shaped coupling means having a key mounted on the inter-rim thereof, said ring-shaped coupling means mounted on a load; and
   a step motor shaft adaptable for inserting into the center of said ring-shaped coupling means, wherein said step motor shaft and said key forming a predetermined back-lash distance when said step motor shaft rotates in a first rotation direction and travels through a first distance, and said step motor shaft driving said load via said ring-shaped coupling means at a desired speed which is obtained by traveling through said predetermined back-lash distance in a second rotation direction.

2. The structure as claimed in claim 1, wherein said first distance is longer than said predetermined back-lash distance.

3. The structure as claimed in claim 1, wherein said step motor shaft is driven by a low-power step motor.

4. A method for coupling a step motor shaft, comprising:

providing a shaft coupling means having a key for connecting to a step motor shaft and a load in a manner that a predetermined back-lash distance being defined between said key and said step motor shaft;

enabling said step motor shaft to rotate in a first direction for a first distance to form said predetermined back-lash distance between said key and said step motor shaft;

reversing said first rotation direction of said step motor shaft into a second rotation direction as soon as said predetermined back-lash distance between said key and said step motor shaft is formed; and driving said load at an accelerated speed by traveling through said predetermined back-lash distance in said second rotation direction for said step motor shaft.

5. The method as claimed in claim 4, wherein said first distance is longer than said predetermined back-lash distance.

6. The method as claimed in claim 4, wherein said step motor shaft is driven by a low-power step motor.

7. A structure for coupling a step motor shaft, comprising:

a first coupling means for connecting to a shaft; and a second coupling means for connecting to a load, said second coupling means adaptable for connecting to said first coupling and forming a back-lash distance therebetween, wherein said first coupling means and said second coupling means forming said predetermined back-lash distance when said step motor shaft rotates in a first rotation direction and travels through a first distance, and said step motor shaft driving said load with the connection of said first coupling means and said second coupling means and at a desired speed which is obtained by traveling through said predetermined back-lash distance in a second rotation direction.

8. The structure as claimed in claim 7, wherein said first distance is longer than said predetermined back-lash distance.

9. The structure as claimed in claim 7, wherein said step motor shaft is driven by a low-power step motor.

* * * * *